(12) United States Patent
Dorschu et al.

(10) Patent No.: US 8,871,046 B2
(45) Date of Patent: Oct. 28, 2014

(54) TRANSPARENT ANTIBALLISTIC ARTICLE AND METHOD FOR ITS PREPARATION

(75) Inventors: Marko Dorschu, Beek (NL); Markus Johannes Henricus Bulters, Sittard (NL); Alexander Antonius Marie Stroeks, Valkenburg aan de Geul (NL); Jan Stolk, Sittard (NL)

(73) Assignee: DSM IP Assets B.V., Heerlen (NL)

( * ) Notice: Subject to any disclaimer, the term of this patent is extended or adjusted under 35 U.S.C. 154(b) by 591 days.

(21) Appl. No.: 13/133,263

(22) PCT Filed: Dec. 10, 2009

(86) PCT No.: PCT/EP2009/066779
§ 371 (c)(1),
(2), (4) Date: Aug. 29, 2011

(87) PCT Pub. No.: WO2010/066819
PCT Pub. Date: Jun. 17, 2010

(65) Prior Publication Data
US 2011/0303078 A1  Dec. 15, 2011

(30) Foreign Application Priority Data
Dec. 11, 2008 (EP) .................................. 080215007

(51) Int. Cl.
| | |
|---|---|
| *B29C 43/20* | (2006.01) |
| *F41H 5/02* | (2006.01) |
| *F41H 5/04* | (2006.01) |
| *B32B 27/32* | (2006.01) |
| *B32B 27/34* | (2006.01) |
| *B32B 7/02* | (2006.01) |

(52) U.S. Cl.
CPC .............. *F41H 5/0407* (2013.01); *B32B 27/32* (2013.01); *B32B 27/34* (2013.01); *B32B 7/02* (2013.01)
USPC ............................... 156/243; 156/60; 156/242

(58) Field of Classification Search
USPC .......................................... 156/243, 242, 60
See application file for complete search history.

(56) References Cited

U.S. PATENT DOCUMENTS

| | | | |
|---|---|---|---|
| 4,594,290 A | 6/1986 | Fischer et al. | |
| 5,229,204 A | 7/1993 | Labock | |
| 5,506,051 A | 4/1996 | Levy-Borochov et al. | |
| 6,893,704 B1 | 5/2005 | Van Der Loo | |

FOREIGN PATENT DOCUMENTS

| | | | |
|---|---|---|---|
| DE | 24 24 255 | 11/1975 | |
| EP | 0 205 960 A2 | 12/1986 | |
| EP | 0 733 460 A2 | 9/1996 | |
| EP | 0 807 797 | 11/1997 | |
| EP | 1 627 719 | 2/2006 | |
| EP | 1627719 A1 * | 2/2006 | ............. B29C 43/00 |
| GB | 2 042 414 A | 9/1980 | |
| GB | 2 051 667 A | 1/1981 | |
| WO | 01/73173 A1 | 10/2001 | |
| WO | WO 2004/039565 | 5/2004 | |
| WO | WO 2008/098771 | 8/2008 | |
| WO | WO 2008098771 A1 * | 8/2008 | |

OTHER PUBLICATIONS

Nakajima, "Advanced Fibre Spinning Technology," Woodhead Publ. Ltd., ISBN 185573 182, 1994.
International Search Report for PCT/EP2009/066779, dated Sep. 14, 2010.

* cited by examiner

*Primary Examiner* — Brent O'Hern
(74) *Attorney, Agent, or Firm* — Nixon & Vanderhye P.C.

(57) ABSTRACT

The invention relates to a method for the preparation of a transparent antiballistic article. The method comprises providing a plurality of anisotropic polymeric film layers, stacking the film layers to form an assembly and compressing the thus formed assembly at a temperature and pressure sufficient to consolidate the film layers, whereby the temperature is not more than 50° C. below the melting temperature of the polymer, the pressure is at least 80 MPa and sufficiently high to obtain an optical transparency according of at least 50% transmission. The invention also relates to a ballistic resistant article having an energy absorption for 17 grain FSP according to the STANAG 2920 standard of at least 10 J/(kg/m$^2$) and an optical transparency according of at least 50% transmission.

11 Claims, No Drawings

TRANSPARENT ANTIBALLISTIC ARTICLE AND METHOD FOR ITS PREPARATION

This application is the U.S. national phase of International Application No. PCT/EP2009/066779 filed 10 Dec. 2009 which designated the U.S. and claims priority to EP Patent Application No. 08021500.7 filed 11 Dec. 2008, the entire contents of each of which are hereby incorporated by reference.

The invention relates to a method for the preparation of a transparent antiballistic article and to a transparent antiballistic resistant article.

Transparent antiballistic articles are designed to be optically transparent, yet protect from fragmentation or ballistic impact. Examples include transparent armor window and visors, which not only need to defeat the designated threat but also to provide a multi-hit capability with minimized mechanical and visual distortions.

Attempts have been made to provide articles of intrinsically transparent materials, such as for instance polycarbonate, polyurethane or laminated sheet glass, with antiballistic properties, for instance by increasing the thickness of the article. This however is impractical as it increases weight and imposes space limitations. Also, the level of antiballistic protection offered is generally too low, and a need exists to increase the level of antiballistic performance for such articles.

The object of the present invention therefore is to provide a transparent antiballistic article with an improved combination of transparency and antiballistic performance, and a method for the preparation of such a transparent antiballistic article.

This object is achieved according to the invention by a method for the preparation of a transparent antiballistic article, the method comprising (a) providing a plurality of preferably anisotropic polymeric film layers; (b) stacking the preferably anisotropic film layers to form an assembly thereof; (c) compressing the thus formed assembly at a temperature and pressure sufficiently high to consolidate the film layers, whereby the temperature is not more than 50° C., preferably not more than 25° C., even more preferably not more than 10° C. below the melting temperature of the polymer, the pressure is preferably at least 80 MPa, more preferably at least 100 MPa and sufficiently high to obtain an optical transparency, as to be defined hereinafter, of at least 50% transmission.

Articles for which the optical transparency is below this level of at least 50% transmission are in the context of the present invention referred to as optically translucent, by which is meant that light passes through the article but images are blurred due to serious light scattering.

An antiballistic article produced by the method of the invention provides the desired combination of transparency and antiballistic performance. The level of transparency achievable is surprising since the produced article comprises a plurality of preferably anisotropic polymeric film layers that define a plurality of interfaces in between the layers. Since light is easily scattered at these interfaces, one would expect a reduced transparency against a monolithic article.

The polymeric film layers to be used in the method of the invention are preferably anisotropic. By anisotropic is meant in the context of the present application that two mutually perpendicular directions can be defined in the plane of the film for which the modulus of elasticity in a first direction is at least 3 times higher than the modulus of elasticity in the direction perpendicular to it. Generally said first direction of the preferably anisotropic polymeric film layers is in the art also referred to as machine direction or drawing direction (or as direction of orientation) having the highest mechanical properties.

In a preferred method according to the invention, a plurality of multilayered material sheets of consolidated stacks of the anisotropic polymeric film layer, wherein the direction of orientation, i.e. the machine direction, of two subsequent film layers in the stack differs by an angle $\alpha$, is stacked to form the assembly. Although the angle $\alpha$ may be selected within wide ranges, angle $\alpha$ is preferably between 45 and 135°, more preferably between 65 and 115° and most preferably between 80 and 100°. In the latter preferred range a particularly preferred angle $\alpha$ is about 90°, since an antiballistic article is then obtained having an optimum combination of antiballistic properties and transparency. A material sheet of anisotropic polymeric film layers, wherein the direction of orientation of two subsequent film layers differs by an angle $\alpha=90°$ is denoted in the art as a cross-ply.

The multilayer material sheet according to the invention preferably comprises at least 2 polymeric film layers, preferably at least 4 polymeric film layers, more preferably at least 6 polymeric film layers, even more preferably at least 8 polymeric film layers and most preferably at least 10 polymeric film layers. Increasing the thickness of the polymeric film layers in the multilayer material sheet of the invention simplifies the manufacture of articles form these material sheets, for instance antiballistic plates. Until now it was not considered, nor possible to use such multilayer material sheet in the manufacture of transparent antiballistic articles. Such is now made possible with the process according to the invention.

Consolidation of the polymeric film layers may suitably be carried out in a hydraulic press. Consolidation is intended to mean that the film layers are relatively firmly attached to one another to form one unit. The temperature during consolidating generally is controlled through the temperature of the press. A minimum temperature generally is chosen such that a reasonable speed of consolidation is obtained. In this respect 80° C. is a suitable lower temperature limit, preferably this lower limit is at least 100° C., more preferably at least 120° C., most preferably at least 140° C. According to the invention, the temperature at which the film layers are consolidated under pressure should not deviate appreciably from the melting temperature of the polymer. In a preferred embodiment of the method the temperature is not more than 10° C. below the melting temperature of the polymer. Determination of the melting temperature of the polymer is a technique generally know to the skilled person and includes DSC measurement with a heating rate of 10°/min whereby the temperature at the maximum of the melting peak is defined as the melting temperature. In case the polymeric film layers do not exhibit a clear melting temperature, the temperature at which the film layers starts to lose its mechanical properties should be read instead of melting temperature. This can be determined by methods know to the skilled man including measuring stiffness against temperature.

Further according to the invention, the pressure for consolidating the polymeric film layers, to achieve good optical transparency, should be at least 80 MPa. A preferred method is characterized in that the pressure is at least 100 MPa or better is at least 120 MPa, more preferred at least 180 MPa, even more preferred at least 250 MPa and most preferred at least 300 MPa. At pressure levels exceeding 180 MPa, and dependent on the particular polymer selected, an optical transparency of at least 80% transmission can be achieved.

The optimum time for consolidation generally ranges from 5 to 120 minutes, depending on conditions such as temperature, pressure and part thickness and can be verified through routine experimentation. Preferably, in order to obtain high antiballistic performance, cooling after compression moulding at high temperature is carried out under pressure as well. Pressure is preferably maintained at least until the temperature is sufficiently low to prevent relaxation of the polymer. Typically such temperature is at most 80° C.

In a further preferred embodiment of the method of the invention, a vacuum is applied to the assembly before, during or after compressing said assembly. Preferably such vacuum is applied before or during compressing. Such vacuum may suitably be applied through a vacuum chamber or through the use of a vacuum bag. This measure has proven to be beneficial in increasing optical transparency of the produced article, but surprisingly also in increasing the antiballistic performance of the article. The applied vacuum preferably reduces the environmental pressure with at least 0.05 MPa, more preferably with at least 0.08 MPa, even more preferably with at least 0.09 and most preferably with at least 0.095 MPa.

In the present invention and in particular in a preferred method according to the invention, the polymer in the preferably anisotropic polymer film is preferably a thermoplastic polymer that is selected from the group consisting of polyolefins-such as polyethylene-, polyesters, polyvinyl alcohols, polyacrylonitriles, polyamides or polyketone. Suitable polyamides are, for example, the aliphatic polyamides PA-6, PA-6,6, PA-9, PA-11, PA-4,6, PA-4,10 and copolyamides thereof and semi-aromatic polyamides based on for example PA-6 or PA-6,6 and aromatic dicarboxylic acids and aliphatic diamines, for example isophthalic acid and terephthalic acid and hexanediamine, for example PA-4T, PA-6/6,T, PA-6,6/6, T, PA-6,6/6/6,T and PA-6,6/6,I/6,T. Preferably PA-6, PA-6,6 and PA-4,6 are chosen. Furthermore, also polyamide blends are suitable.

Suitable thermoplastic polyesters are, for example, poly (alkylene terephthalate)s, like polybutyleneterephthalate (PBT), polytrimethyleneterephthalate (PTT), polyethyleneterephthalate (PET), polycyclohexanedimethyleneterephthalate (PCT), and poly(alkylene naphthanate)s, like polyethylenenaphthanate (PEN), and copolymers and mixtures.

Particularly preferred are methods whereby the polymer in the polymeric film comprises ultra high molecular weight polyethylene and/or polyamide. These polymers yield the best combination of optical transparency and antiballistic performance.

The ultra high molecular weight polyethylene may be linear or branched, although preferably linear polyethylene is used. Linear polyethylene is herein understood to mean polyethylene with less than 1 side chain per 100 carbon atoms, and preferably with less than 1 side chain per 300 carbon atoms; a side chain or branch generally containing at least 10 carbon atoms. Side chains may suitably be measured by FTIR on a 2 mm thick compression moulded film, as mentioned in e.g. EP 0269151. The linear polyethylene may further contain up to 5 mol % of one or more other alkenes that are copolymerisable therewith, such as propene, butene, pentene, 4-methylpentene, octene. Preferably, the linear polyethylene is of high molar mass with an intrinsic viscosity (IV, as determined on solutions in decalin at 135° C.) of at least 4 dl/g; more preferably of at least 8 dl/g, most preferably of at least 10 dl/g. Such polyethylene is also referred to as ultra high molecular weight polyethylene. Intrinsic viscosity is a measure for molecular weight that can more easily be determined than actual molar mass parameters like Mn and Mw. A polyethylene film of this type yields particularly good antiballistic performance.

Anisotropic polymeric films may be prepared in a number of ways. A preferred method for the formation of the films comprises feeding a polymeric powder between a combination of endless belts, compression-moulding the polymeric powder at a temperature below the melting point thereof and rolling the resultant compression-moulded polymer followed by drawing. Such a method is for instance described in EP 0 733 460 A2, which is incorporated herein by reference. If desired, prior to feeding and compression-moulding the polymer powder, the polymer powder may be mixed with a suitable liquid organic compound having a boiling point higher than the melting point of said polymer. Compression moulding may also be carried out by temporarily retaining the polymer powder between the endless belts while conveying them. This may for instance be done by providing pressing platens and/or rollers in connection with the endless belts.

Another preferred method for the formation of films comprises feeding a polymer to an extruder, extruding a film at a temperature above the melting point thereof and drawing the extruded polymer film below its melting temperature. If desired, prior to feeding the polymer to the extruder, the polymer may be mixed with a suitable liquid organic compound, for instance to form a gel, such as is preferably the case when using ultra high molecular weight polyethylene.

Preferably the polymeric films are prepared by a gel process. A suitable gel spinning process is described in for example GB-A-2042414, GB-A-2051667, EP 0205960 A and WO 01/73173 A1, and in "Advanced Fibre Spinning Technology", Ed. T. Nakajima, Woodhead Publ. Ltd (1994), ISBN 185573 182 7. In short, the gel spinning process comprises preparing a solution of a polyolefin of high intrinsic viscosity, extruding the solution into a film at a temperature above the dissolving temperature, cooling down the film below the gelling temperature, thereby at least partly gelling the film, and drawing the film before, during and/or after at least partial removal of the solvent.

Drawing, preferably uniaxial drawing, of the produced polymeric films may be carried out by means known in the art. Such means comprise extrusion stretching and tensile stretching on suitable drawing units. To attain increased mechanical strength and stiffness, drawing may be carried out in multiple steps. In case of the preferred ultra high molecular weight polyethylene films, drawing is typically carried out uniaxially in a number of drawing steps. The first drawing step may for instance comprise drawing to a stretch factor of 3. Multiple drawing may typically result in a stretch factor of 9 for drawing temperatures up to 120° C., a stretch factor of 25 for drawing temperatures up to 140° C., and a stretch factor of 50 for drawing temperatures up to and above 150° C. By multiple drawing at increasing temperatures, stretch factors of about 50 and more may be reached. This results in high strength anisotropic films, whereby for films of ultra high molecular weight polyethylene, strengths of 1.5 GPa to 1.8 GPa and more may be obtained.

The thickness of the preferably anisotropic film layers can in principle be selected within a wide range. Preferably however, the thickness of at least one film layer does not exceed 150 μm, more preferably does not exceed 80 μm, even more preferably does not exceed 50 μm and most preferably does not exceed 30 μm. For practical reasons such thickness will preferably be at least 5 μm, more preferably at least 10 μm. Particularly good antiballistic performance is achieved if the thickness of substantially all film layers, preferably each film layer, does not exceed 150 μm, more preferably does not exceed 80 μm, and most preferably does not exceed 30 μm. By limiting the thickness of at least one of the film layers in the stack to the claimed thickness, sufficient antiballistic performance is surprisingly achieved even with film layers having rather limited strengths.

The strength of the film layers largely depends on the polymer from which they are produced, and on their, preferably uniaxial stretch ratio. The strength of at least one anisotropic film layer is preferably at least 0.4 GPa, as measured in its strongest direction, more preferably at least 0.75 GPa, even more preferably at least 1.2 GPa, even more preferably at least 1.5 GPa, even more preferably at least 1.8 GPa, even more preferably at least 2.1 GPa, and most preferably at least 3 GPa. The polymeric film layers are preferably sufficiently interconnected to each other, meaning that the polymeric film layers do not delaminate under normal use conditions such as e.g. at room temperature.

The method according to the invention is particularly useful in manufacturing antiballistic articles, such as armoured plates, visors, antiballistic windows, which are also transparent. In the context of this invention an antiballistic article is an article that withstands impact of a projectile travelling at a speed of at least 25 m/s, more preferably at least 50 m/s and more preferably at least 100 m/s. Antiballistic applications comprise applications with ballistic threat against projectiles of several kinds including against armor piercing, so-called AP bullets and hard particles such as e.g. fragments and shrapnel.

The invention also relates to such a transparent antiballistic article. According to the invention such an antiballistic article has an energy absorption for 17 grain fragment simulating projectiles (FSP) according to the STANAG 2920 standard of at least 10 J/(kg/m2) and an optical transparency of at least 50% transmission, preferably of at least 60% transmission. An even more preferred transparent antiballistic article has an energy absorption according to the STANAG 2920 standard of at least 15, preferably 20 J/(kg/m2) and an optical transparency of at least 80% transmission, more preferably of at least 90% transmission.

An antiballistic article produced according to the invention comprises at least 2 polymeric film layers, preferably at least 10 polymeric film layers, more preferably at least 20 polymeric film layers, even more preferably at least 30 polymeric film layers and most preferably at least 40 polymeric film layers. Antiballistic articles, manufactured by the method of the present invention, are particularly advantageous over previously known antiballistic materials as they provide at least the same level of protection as the known articles at a significantly lower weight, or an improved antiballistic performance at equal weight compared with the known article, and moreover have transparency. Starting materials are inexpensive and the manufacturing method is relatively short and thus cost effective. Since different polymers may be used to produce the antiballistic article, properties may be optimized according to the particular application. Besides antiballistic performance, properties include for instance heat stability, shelf-life, deformation resistance, bonding capacity to other material sheets, formability, and so on.

The invention is now further explained by means of the following example without being limited hereto.

EXAMPLE 1

Production of Anisotropic UHMWPE Film

An ultrahigh molecular weight polyethylene with an intrinsic viscosity of 20 was mixed to become a 7 wt % suspension with decalin. The suspension was fed to an extruder and mixed at a temperature of 170° C. to produce a homogeneous gel. The gel was then fed through a slot die with a width of 600 mm and a thickness of 800 μm. After being extruded through the slot die, the gel was quenched in a water bath, thus creating a gel-tape. The gel tape was stretched by a factor of 3.8 after which the tape was dried in an oven consisting of two parts at 50° C. and 80° C. until the amount of decalin was below 1%. This dry gel tape was subsequently uniaxially stretched in an oven at 140° C., with a stretching ratio of 5.8, followed by a second uniaxial stretching step at an oven temperature of 150° C. to achieve a final thickness of 18 micrometer and a width of around 40 mm.

Production of Armor Panels from the Films

A total number of 40 layers of the polymeric films as produced were stacked onto each other, whereby stacking was done such that the draw directions of adjacent layers were perpendicular to each other. The stacks of layered tapes were put into a press and pressed at a temperature of 145° C. and a pressure of 100 MPa for 65 minutes. Cooling was performed under pressure until a temperature of 80° C. was reached. No bonding agent was applied to the tapes. Nevertheless, the stacks were transformed into a rigid homogeneous 800×400 mm plate.

Performance Testing of Armour Panels

The armour plates were subjected to shooting tests performed with 17 grain FSP. The tests were performed with the aim of determining a V50 and/or the energy absorbed (E-abs). V50 is the speed at which 50% of the projectiles will penetrate the armoured plate. The testing procedure was as follows. The first projectile was fired at the anticipated V50 speed. The actual speed was measured shortly before impact. If the projectile was stopped, a next projectile was fired at an intended speed of about 10% higher. If it perforated, the next projectile was fires at an intended speed of about 10% lower. The actual speed of impact was always measured. V50 was the average of the two highest stops and the two lowest perforations. The performance of the armour was also determined by calculating the kinetic energy of the projectile at V50 and dividing this by the AD of the plate (E-abs).

Optical Testing of the Armour Panels

The produced panels were subject to a haze measurement according to ASTM D-1003, measured at a sample thickness of 2 mm and at a wavelength of 600 nm. In this application optical transparency means '100% minus haze' as measured according to the ASTM D-1003 method here above. For the sample of Example 1, a haze of 45% was measured which according to the definition defined herein means a transparency of (100–45%)=55%

Results

| Example | V50 m/s | E-abs J/(kg/m$^2$) | Optical transparency (% transmission) |
|---|---|---|---|
| 1 | 438 | 50.2 | 55 |

The invention claimed is:
1. A method of preparing a transparent antiballistic article, the method comprising:

(a) providing a plurality of anisotropic polymeric film layers;

(b) stacking the anisotropic polymeric film layers to form an assembly thereof; and (c) consolidating the film layers by compressing the assembly formed according to step (b) at a temperature which is not more than 50° C. below a melting temperature of the polymer, and at a pressure which is at least 80 MPa to obtain an optical transparency of at least 50%.

2. The method according to claim 1, which comprises providing a plurality of multilayered material sheets of consolidated stacks of the anisotropic polymeric film layers, and stacking the plurality of multilayered material sheets such that an orientation direction of two subsequent film layers in the stack differs.

3. The method according to claim 1, wherein the temperature is not more than 10° C. below the melting temperature of the polymer.

4. The method according to claim 1, wherein the pressure is at least 200 MPa.

5. The method according to claim 1, wherein the pressure is sufficiently high to obtain an optical transparency of at least 80% transmission.

6. The method according to claim 1, which comprises applying a vacuum to the assembly before, during or after compressing the assembly according to step (c).

7. The method according to claim 1, wherein at least one of the anisotropic film layers has a thickness which does not exceed 150 microns.

8. The method according to claim 7, wherein the thickness of at least one of the anisotropic film layers does not exceed 30 microns.

9. The method according to claim 1, wherein at least one of the anisotropic film layers has a strength, as measured in direction of greatest strength, which is at least 0.4 GPa.

10. The method according to claim 9, wherein the strength of at least one of the anisotropic film layers is at least 1.5 GPa.

11. The method according to claim 1, wherein the polymer is selected from the group consisting of polyolefins, polyesters, polyvinyl alcohols, polyacrylonitriles, polyamides, and polyketone.

* * * * *